May 3, 1932.  F. C. McELROY  1,856,842
LENS FOR MOTOR VEHICLE HEADLAMPS
Filed Oct. 17, 1929
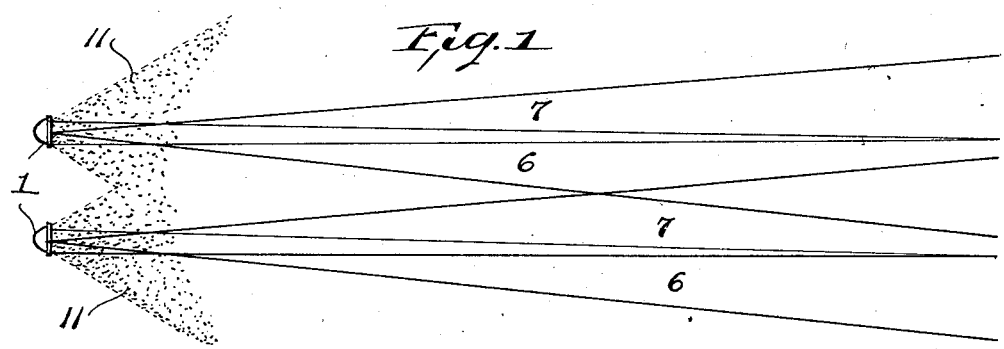
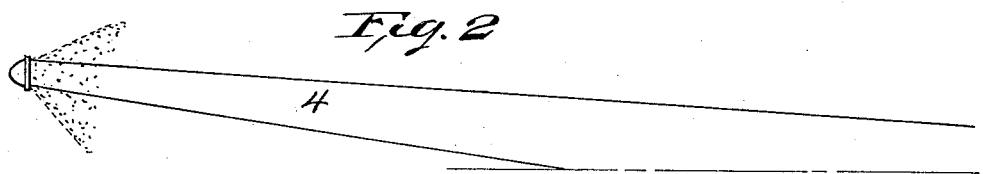
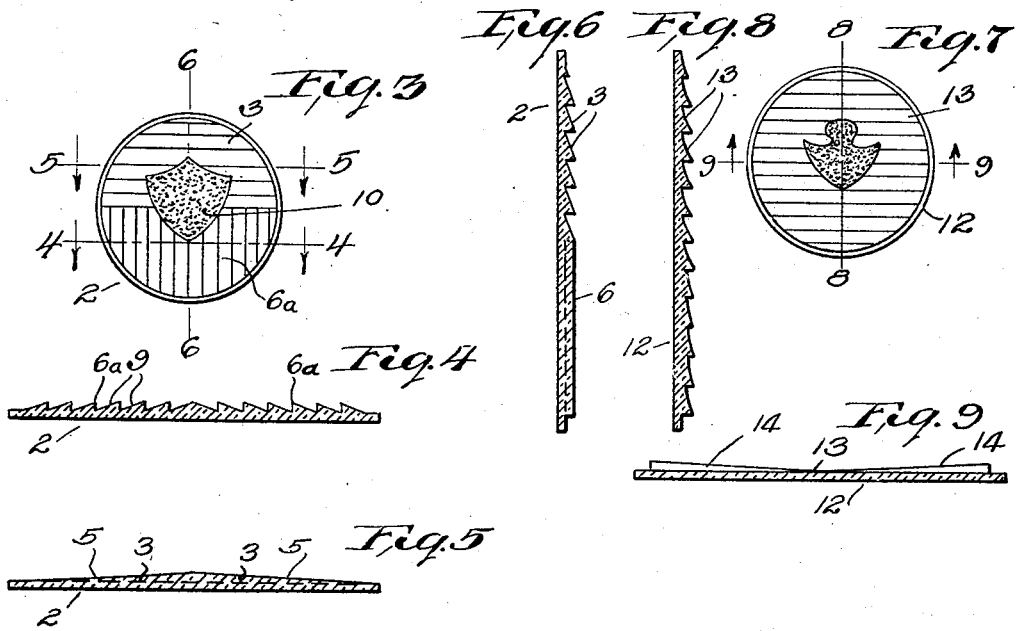
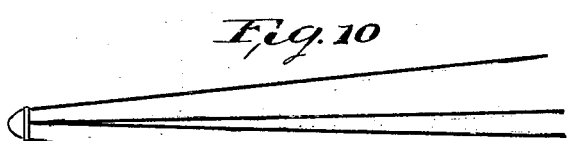
Inventor
Frank C. McElroy
By W. D. McDowell
Attorney Patented May 3, 1932

1,856,842

UNITED STATES PATENT OFFICE

FRANK C. McELROY, OF COLUMBUS, OHIO

LENS FOR MOTOR VEHICLE HEAD LAMPS

Application filed October 17, 1929. Serial No. 400,404.

This invention relates to the art of motor vehicle illumination and is particularly directed to an improved lens structure for use in vehicle headlamps wherein the lens structure possesses light refractive properties so calculated to direct light issuing from the associated lamps into essential areas of road or highway illumination preceding the vehicle, but wherein the propagation of light from the lamps into undesired zones is precluded.

It is customary to-day in the art of motor vehicle illumination to provide motor vehicle illuminating lamps with incandescent bulbs having spaced filaments capable of being selectively energized. These filaments bear a predetermined focal relationship to the polished surfaces of an associated reflector so that when one of said filaments is energized long range beams will be projected from the lamps and when the other filament is energized a short range beam will be projected. The long range beam is usually employed in the absence of an approaching vehicle, and the short range beam is employed for travel in congested traffic districts or when approaching another vehicle on a highway.

It has already been proposed to provide mechanical means for rocking or tilting the reflector relative to a fixed stationary bulb to secure long and short range beams, and in the attainment of this result certain constructions employ a single filament bulb provided with a manually operated means for changing the position of its filament with respect to the stationary reflecting surfaces of a lens reflector. It will be observed that in these standard systems to procure the most satisfactory results it is necessary for the vehicle driver to execute certain manual operations such as by operating a switch or by operating other forms of mechanical controls. It is a matter of common knowledge that many drivers fail to operate the controls to secure the degree of protection and safety contained in the illuminating systems and, therefore, it is a primary object of the present invention to provide in a motor vehicle lamp a lens of such construction that the lamp may be used, without adjustment, for all driving situations, whether for city or open highway driving, and wherein the lens is of such construction that the light beams projected from the lamp will be directed into certain essential zones preceding the vehicle but which will not interfere with the vision of an approaching motorist and particularly will not produce that visual discomfort ordinarily referred to as "glare".

The construction of the lens is also such as to produce specific positively directed rays of light laterally to the sides of the vehicle, in order that curbing, ditches, signs and overhead obstructions may be clearly illuminated.

It is a further object of the invention to provide the lens in the axial center thereof with a colored translucent area, which shields the light source from direct front view and softens to an approaching driver the light issuing from the lamp in order to promote the safety of passing motorists.

For a further understanding of the invention reference is to be had to the following description and the accompanying drawings wherein:

Figure 1 is a plan view illustrating diagrammatically the paths of light projection produced by motor vehicle lamps equipped with lenses formed in accordance with the present invention, Figure 2 is a similar view but illustrating the light beams in side elevation, Figure 3 is a front elevation of a lens constructed in accordance with the present invention, Figure 4 is a horizontal sectional view taken through the lower part of the lens on the line 4—4 of Figure 3, Figure 5 is a similar view on the line 5—5 of Figure 3, Figure 6 is a vertical sectional view taken on the line 6—6 of Figure 3, Figure 7 is a front elevation of a modified form of lens, Figure 8 is a vertical sectional view on the line 8—8 of Figure 7, Figure 9 is a horizontal sectional view on the line 9—9 of Figure 7, and Figure 10 is a plan view illustrating diagrammatically light issuing from a lamp provided with the form of lens shown in Figure 7.

Referring more particularly to the drawings, the numeral 1 designates a vehicle headlamp in which may be mounted the usual reflector and an incandescent bulb (not shown). The front of the lamp is provided with a glass closure or lens 2, the construction of which constitutes the gist of the present invention. In the preferred form of lens, illustrated in Figures 3 to 6 inclusive, the lens, as shown, comprises a circular disk-like body of glass. The upper half of the lens is provided with prismatic surfaces 3 which extend horizontally across the face of the lens and which are formed so that the light striking the surfaces 3 will be refracted and cast in a downward direction, that is, at an acute angle with respect to the horizontal, in order to produce substantially the shape of the beam indicated at 4 in Figure 2. The surfaces 3 therefore prevent light issuing from the lens from being projected into zones above the horizontal plane of the lamp 1 since the refractive properties of the prisms 3 are such as to specifically deflect the light in a downward and forward direction on the preceding road surface. By reference to Figure 5 it will be observed that in transverse horizontal section the prismatic surfaces 3 are reversely inclined as indicated at 5 from the center of the lens outwardly toward the edges thereof. This construction serves to produce the crossed beams of light 6 and 7 which are shown in Figure 1. Thus the long range forwardly directed beams of light, indicated at 4, 6 and 7 are not projected horizontally and axially from the headlamps 1, but are specifically angled with respect to the longitudinal axis of the headlamp so that said beams will be directed forwardly, downwardly and laterally to avoid the casting of light rays in the eyes of approaching motorists or observers.

The lower half of the lens, as shown in Figures 3 and 4, is provided with a plurality of parallel vertically arranged prisms 6a. These prisms are so formed that their oblique surfaces 9 on one side of the lens are opposed to the corresponding oblique surfaces of the prisms on the other side of the lens. The surfaces 9, therefore, operate to project the light laterally to accomplish substantially the same results as are obtained from the surfaces 5 in order to produce the specifically angular light beams 4, 6 and 7. Since light issuing from the lower portion of the lamp 1 does not tend to project itself upwardly, the lower portions of the lenses have their prisms 6a formed to merely bend the light rays laterally and not specifically downwardly. The center of the lens is provided with a colored area 10, which conceals the light bulb from direct front view, and furthermore the colored area 10 softens the light issuing from the lamp to enhance the comfort of approaching motorists. I find the area 10 desirable for the reason that it is very difficult to control light rays issuing directly from the source of light or light rays which are reflected from the bulb of the light source. These rays ordinarily do not impinge upon the polished reflecting surface of the reflector and are not readily controllable. However, through the provision of the area 10 these stray light rays are diffused by the colored or translucent glass area 10, and this diffused light is employed, as indicated at 11, to illuminate efficiently the sides of the road and overhead objects. Since this light is so thoroughly diffused and diminished in strength by the area 10 it affords no discomfort or inconvenience to approaching motorists passing through it. The area 10 is preferably of shield form.

In the form of the invention disclosed in Figures 7 to 9 inclusive, the lens 12 is provided with horizontally extending parallel prisms 13 which correspond to the prismatic surfaces 3 of the lens shown in Figure 3. The prisms 13 found in the upper part of the lens 12 possess a greater degree of inclination to the vertical than those found in the lower portion of the lens, as illustrated in Figure 8. This is done in order to correct the tendency of the light to pass upwardly when issuing from the upper half of the lens. In the lens disclosed I have assumed that the light source is positioned either in the focal center of the reflector or, better still, a slight distance to the rear of such focal center. If the light source is positioned in advance of the focal center the position of the lens, as shown in Figures 3 and 7, should be reversed in the lamp.

In view of the foregoing it will be seen that by the provision of the lens described the light issuing from a motor vehicle headlamp, particularly from the upper half of the headlamp is intercepted by the refractive prisms or surfaces 3 and 13 so that when such light is projected forwardly from the lamp it will be positively directed in a downward direction below the horizontal plane defining the top of the lamp. Moreover, due to the formation of the lens surfaces 3 and 13 the light issuing from the lamp to effect direct illumination of the roadway is angularly directed with respect to a projected longitudinal axis of the lamp. This prevents the light from being directed into the eyes of approaching motorists and the latter factor is additionally assured by the inclusion of the colored diffusing zone or area 10.

What is claimed is:

A lens for motor vehicle headlamps, comprising a disk-like body of glass, said lens having its upper end formed to include parallel horizontally extending prisms running from one side of said lens to the other, said prisms including surfaces inclined with respect to the horizontal and vertical for directing light passing therethrough to areas below the horizontal, these surfaces being reversely inclined longitudinally from the center of the lens to direct light rays angularly with respect to the axis projecting longitudinally from the lens, the lower half of said lens being provided with rows of vertically extending parallel prisms formed to direct light rays passing through the lower half of the lens laterally with respect to the longitudinal axis thereof, the prisms of said lower half of the lens having their oblique surfaces on one side of the lens reversed in a direction away from the oblique surfaces of the corresponding prisms of the other side, the inclination of both the upper and lower prism surfaces of the lens being outwardly directed from the central vertical axis of the lens.

In testimony whereof I affix my signature.

FRANK C. McELROY.